United States Patent [19]

Ishihara

[11] Patent Number: 5,687,031
[45] Date of Patent: Nov. 11, 1997

[54] THREE-DIMENSIONAL IMAGE ACQUISITION APPARATUS

[75] Inventor: Mitsuhiro Ishihara, Aichi-ken, Japan

[73] Assignee: Takaoka Electric Mfg. Co., Ltd., Tokyo, Japan

[21] Appl. No.: 603,614

[22] Filed: Feb. 21, 1996

[30] Foreign Application Priority Data

Mar. 3, 1995 [JP] Japan ................................ 7-068925
Sep. 18, 1995 [JP] Japan ................................ 7-237947

[51] Int. Cl.⁶ .................................................. G02B 7/02
[52] U.S. Cl. .................................................. 359/821
[58] Field of Search .................................... 359/821

[56] References Cited

U.S. PATENT DOCUMENTS

| | | | |
|---|---|---|---|
| 3,481,665 | 12/1969 | Rosenberger | 359/821 |
| 4,251,128 | 2/1981 | Feinbloom | 359/821 |
| 4,666,269 | 5/1987 | Nakamura et al. | 351/212 |
| 4,961,636 | 10/1990 | Gaul et al. | 359/821 |
| 5,121,220 | 6/1992 | Nalamoto | 359/821 |
| 5,440,419 | 8/1995 | Boardman et al. | 359/821 |
| 5,508,850 | 4/1996 | Noguchi | 359/821 |
| 5,517,353 | 5/1996 | Ikoh et al. | 359/821 |

*Primary Examiner*—David C. Nelms
*Assistant Examiner*—Thomas Robbins
*Attorney, Agent, or Firm*—Oblon, Spivak, McClellsnd, Maier & Neustadt, P.C.

[57] ABSTRACT

A three-dimensional image acquisition apparatus for acquiring a plurality of images of an object with the positions in focus shifted at predetermined step distances used for measuring the three-dimensional shape of an object.

This three-dimensional image acquisition apparatus comprises an image forming lens, a two-dimensional image pickup means for converting the optical image of an object into electric signals and outputting the electric signals, at least one rotary support which has a plurality of transparent plates differing in thickness or refractive index or both secured thereto and is disposed so that when it is rotated the transparent plates in turn intersects the optical axis between the image forming lens and the object or the image forming lens and the two-dimensional image pickup means, and at least one drive means for intermittently or continuously rotating the rotary support.

By this three-dimensional image acquisition apparatus, the image can be acquired in considerably less time with a higher positional accuracy.

6 Claims, 7 Drawing Sheets

THREE-DIMENSIONAL IMAGE ACQUISITION APPARATUS

BACKGROUND OF THE INVENTION

1. Field of the Invention

This invention relates to a three-dimensional image acquisition apparatus for acquiring a plurality of images of an object with the position in focus shifted by predetermined step distances, and outputting the image data to a processor for performing measurement of the three-dimensional shape of an object, and more specifically to an improved three-dimensional image acquisition apparatus which can perform such image acquisition in a shorter time with a higher positional accuracy.

2. Discussion of the Background

Measurement of the three-dimensional shape of an object is now performed by acquiring a plurality of images of the same object with the position in focus shifted by predetermined step distances (position in focus is the position where the image of an object at the position is focused on the image pickup means by the image forming lens), inputting the image data to the image processor, calculating the local state of localization for each point of each image by image processing, and determining the three-dimensional shape of the object using the local state of localization and the position in focus of each image.

Conventional three-dimensional image acquisition apparatus used for this image acquisition comprises an imaging unit consisting of an image forming lens and a two-dimensional image pickup means for converting the optical image formed thereon by the image forming lens into electric signals, and outputting the electric signals and an imaging unit positioning means for changing the distance between the image forming lens and the object. This image acquisition apparatus acquires a plurality of images of an object, shifting the position in focus by changing the distance between the image forming lens and the object.

The time needed for processing by a computer such as image processing and calculation of the three-dimensional shape of an object as a percentage of the whole time needed for measurement of the three-dimensional shape of the surface of an object can be made sufficiently less by use of dedicated hardware. However, it is difficult to shorten the time taken by the acquisition of images input to the processor because of the structure of the conventional apparatus which shifts the position in focus by moving the imaging unit. If the imaging unit is stopped at each position that shifts the position in focus by a predetermined distance at a positioning accuracy needed to retain the accuracy of the position in focus, acquisition of a plurality of images takes a long time. On the other hand, if the imaging unit is moved continuously and the image is acquired at each position that shifts the position into focus by a predetermined distance, it is difficult to retain the accuracy of the position in focus because the timing of image acquisition affects the accuracy of the position in focus, although the time needed for acquisition of a plurality of images is considerably reduced. The conventional three-dimensional image acquisition apparatus thus has the problem of needing a long time for image acquisition or a lowered accuracy of position in focus.

SUMMARY OF THE INVENTION

This invention was made to solve the above problem of the conventional three-dimensional image acquisition apparatus, and provides an improved three-dimensional image acquisition apparatus which can acquire a plurality of images of the same object with the position in focus shifted by a predetermined distance in less time with a high positional accuracy.

To attain the above object, the three-dimensional image acquisition apparatus of this invention is constructed so that a plurality of transparent plates which shift the position in focus by a predetermined distance are made to intersect the optical axis of the image forming lens.

Each of the transparent plates changes the position in focus according to the thickness and refractive index without magnifying, reducing, or distorting the image. That is, they provide an essentially zero magnification.

The transparent plates are secured to a rotary support, and caused to intersect the optical axis by the rotation of the rotary support.

An image is acquired each time the transparent plate to be used intersects the optical axis.

Since the three-dimensional image acquisition apparatus of this invention, unlike the conventional apparatus, does not change the distance between the object and the image forming lens or that between the image forming lens and the two-dimensional image pickup means, images can be acquired in less time, and the timing of image acquisition does not affect the accuracy of the position in focus.

More specifically, the image acquisition apparatus of this invention comprises an image forming lens, a two-dimensional image pickup means for converting the optical image of the object formed thereon by the image forming lens, at least one rotary support which has a plurality of transparent plates of different thicknesses or refractive index or both of them secured thereto and is disposed so that when rotated the transparent plates are in turn caused to intersect the optical axis of the image forming lens between the image forming lens and the object, or between the image forming lens and said two-dimensional image pickup means, and at least one drive means for rotating the rotary support.

The rotary support is preferably a flat plate with the axis of revolution parallel to the optical axis, a cone with the axis of revolution crossing the optical axis of the image forming lens obliquely, or a cylinder with the axis of revolution crossing the optical axis of the image at right angles.

The transparent plates are preferably mounted on the rotary support so as to be rotated around the axis of revolution, because the transparent plates can be easily caused to intersect with the optical axis by rotating the rotary support.

Further, a mark may be placed at least one location of at least one of the rotary supports. A mark detecting means for detecting the mark and generating a signal is disposed at an appropriate position of the apparatus. By acquiring the image in synchronism with the signal from the mark detecting means, image acquisition can be easily synchronized with the intersection of each transparent plate with the optical axis if the rotary supports are continuously rotated, hence the drive mechanism can be made simpler.

Other objects, features and advantages of the invention will hereinafter become more readily apparent from the following description.

DETAILED DESCRIPTION OF THE PREFERRED EMBODIMENTS

Next, preferred embodiments of the three-dimensional image acquisition apparatus of this invention are described with reference to the drawings.

Figure 1:
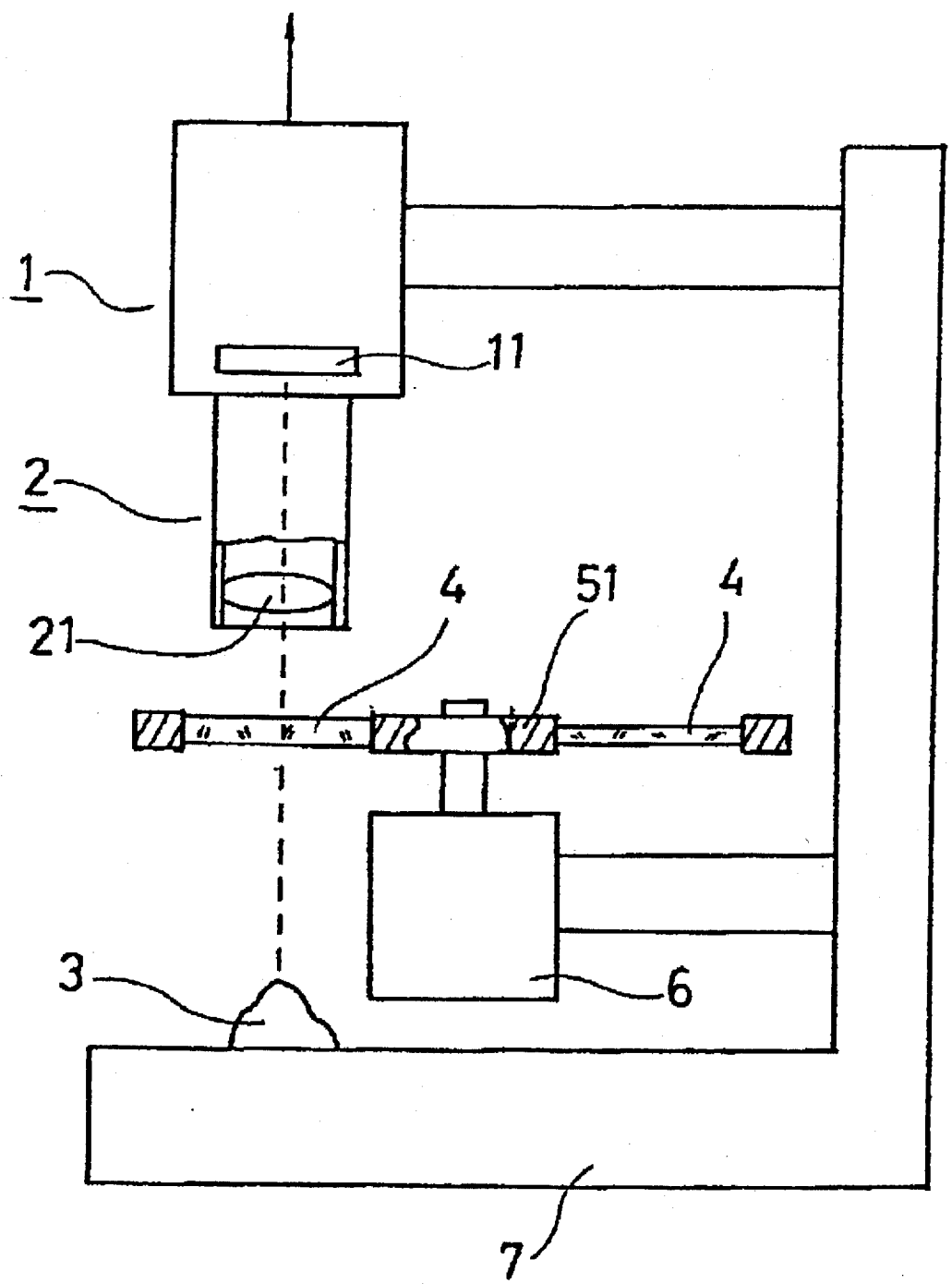
FIG. 1 as a partial sectional side view of a first embodiment of a three-dimensional image acquisition apparatus of this invention.
Figure 2:
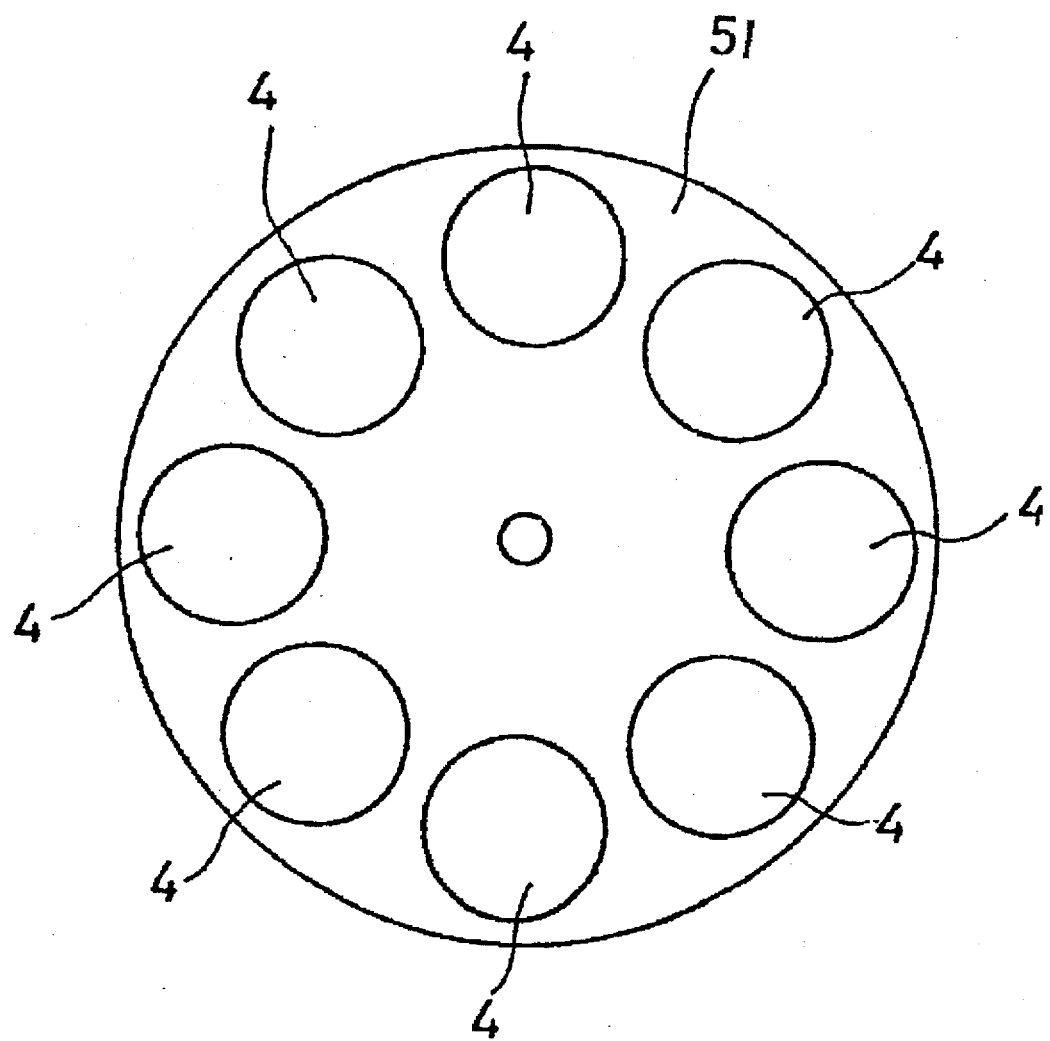
FIG. 2 as a plan view of a rotary support in the shape of a circular plate used the first embodiment of the three-dimensional image acquisition apparatus of this invention.

FIG. 1 is a partial sectional side view of a first embodiment of a three-dimensional image acquisition apparatus of this invention. In FIG. 1, a two-dimensional image pickup means 1, such as a TV camera, converts the optical image into electric signals conforming to the NTSC standard, for example, and sends the electric signals to a processing unit (not shown). The two-dimensional image pickup means 1 contains a photoelectric conversion device 11 such as a CCD (Charge Coupled Device). An optical system 2 contains an image forming lens 21 which forms an optical image of the object 3 on the photoelectric conversion device 11. A rotary support 51 is provided in the shape of a circular plate. A plurality of transparent plates 4 with the same refractive index and different thicknesses, made of optical glass or an appropriate other material, are embedded in the rotary support 51 around the axis of revolution as shown in FIG. 2. A driving means 6, such as a motor, rotates the rotary support 51.

The two-dimensional image pickup means 1 and the drive means 6 are secured to the frame 7 of the apparatus. The object is mounted on the frame 7 at a location directly under the image forming lens 21. The rotary mount 51 is securely positioned so that the transparent plates 4 are intersect the optical axis between the image forming lens 21 and the object 3.

Figure 3:
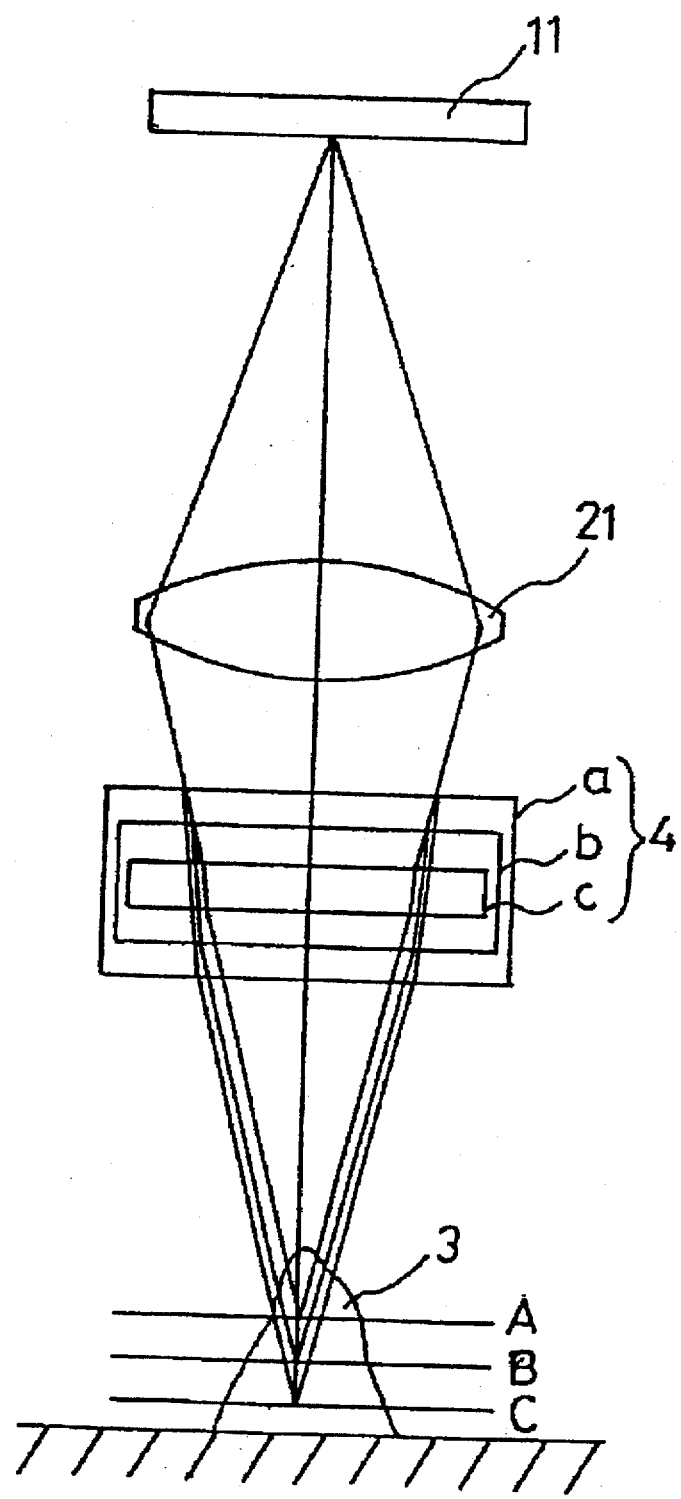
FIG. 3 is a diagram that shows the change of the distance from the image forming lens to the object (or part of an object) by transparent plates of different thicknesses.
Figure 4:
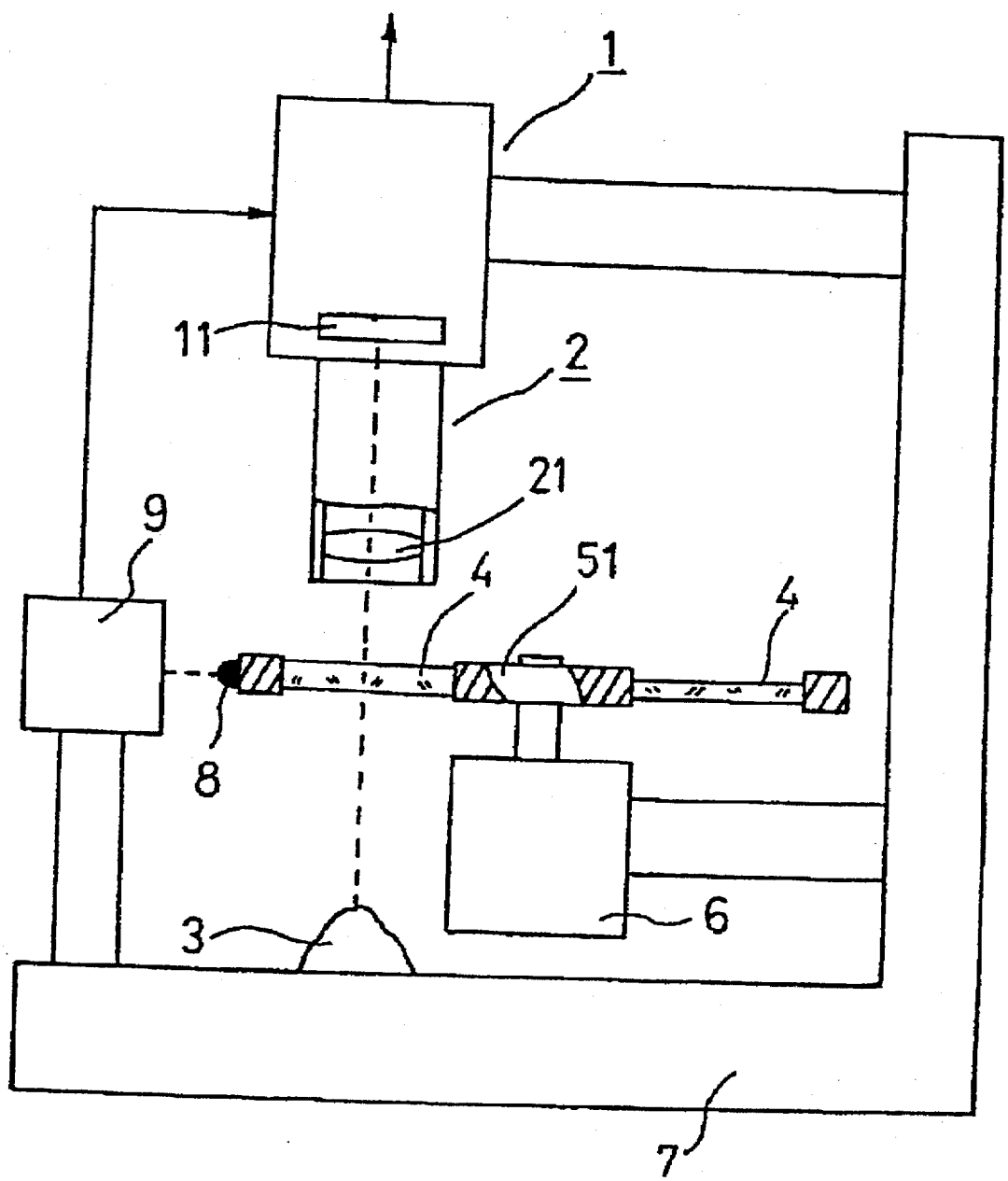
FIG. 4 as a partial sectional side view of a second embodiment of a three-dimensional image acquisition apparatus of this invention.

FIG. 3 shows the shifting of the position in focus by the transparent plates 4. The position in focus is shifted by the transparent plates 4 by a distance corresponding to their thicknesses because of refraction, although the distance between the object 3 and the image forming lens 21 and that between the image forming lens 21 and the photoelectric conversion device 11 are fixed. As shown in FIG. 4, the position in focus is shifted to position A, B, and C by transparent plates a, b, and c. That is, the position in focus farther as the transparent plate becomes thicker.

Since the transparent plates 4 have a uniform thickness, the position in focus is not affected by the deviation of the position of the transparent plate 4 in the front-to-rear and left-to-right directions if the transparent plate 4 intersects the optical axis. Therefore, an error in the timing of image acquisition does not affect the accuracy of the position in focus if the image is acquired while rotating the rotary support 51 continuously.

Further, the image is not magnified or reduced by the transparent plates 4, hence the scaling of the images need not be corrected.

For transparent plates 4 of optical glass with the same refractive index and different thicknesses, the following relationship exists between the difference of thickness of two transparent plates $\Delta d$ and the difference in distance between the positions in focus determined by these plates $\Delta s$:

$$\Delta s = ((n-1)/n)\Delta d$$

where n is the refractive index of the transparent plates.

By using transparent plates 4 with the same refraction index of 1.50 and different thicknesses changing in steps of 60 m, images with positions in focus at intervals of 20 μm can be obtained.

The transparent plates 4 may be optical glass plates with the same thickness and different refractive indices. The relationship between the refractive indices n1 and n2 of two transparent plates and the difference in distance between the positions in focus determined by these plates $\Delta s$ is represented as $$\Delta s = d \cdot \Delta(1/n)$$

where d is the thickness of the transparent plates, and $\Delta(1/n) = (1/n1 - 1/n2)$.

By using transparent plates 4 with the same thickness of 1 mm and different refractive indices such that their reciprocal changes in steps of 0.02, images with the positions in focus at intervals of 20 μm can be obtained. Currently, optical glass with an refractive index of 1.45 to 1.90 (0.53 to 0.69 in reciprocal) can be obtained.

Optical glass plates differing in both thickness and refractive index may also be used. Further, various transparent materials other than optical glass, such as optical crystal and optical plastics and a liquid or liquid crystal contained between plates of a rigid transparent material may be used.

There are two methods of performing the acquisition of images of an object with different positions in focus by this apparatus.

In one of these methods, the rotary support 51 is rotated intermittently and halted when each transparent plate 4 intersects the optical axis and the image is acquired.

In the other method, the rotary support 51 is rotated continuously and the image is acquired when each transparent plate 4 intersects the optical axis.

In the latter method, it is difficult to acquire the image synchronized with the intersection of each transparent plate 4 with the optical axis, by simply acquiring the image at predetermined fixed timings corresponding to the rotational speed of the rotary support 51. This problem can be easily solved by the following method.

FIG. 4 is a partial sectional side view of the second embodiment of the three-dimensional image acquisition apparatus of this invention. A mark 8 is attached to the rotary support 51 at a location near one of the transparent plates 4. A mark detecting means 9 is provided to detect the mark when the mark passes by. The mark detecting means 9 may be an optical, magnetic, or electrostatic sensor. It is preferable for the mark 8 to be suited to the type of detecting means 9. By using the signal from the mark detecting means 9 to determine the time when the image is acquired by the two-dimensional image pickup means 1, the image acquisition can be accurately synchronized with the intersection of each transparent plates 4 and the optical axis.

The mark 8 may be placed at one location on the rotary support 51 or a plurality of marks 8 may be placed at locations corresponding to each transparent plate 4. If one mark 8 is used, the error in synchronization of image acquisition with the intersection of each transparent plate 4 with the optical axis does not become a problem, inasmuch far as the error during one revolution of the rotary support 51 is within the permissible range, because the synchronization is readjusted at each revolution of the rotary support 51.

When marks 8 are placed for all transparent plates 4, the synchronization of image acquisition with the intersection of each transparent plate with the optical axis is readjusted at each transparent plate 4, hence the accuracy of synchronization is significantly increased.

Next, the three-dimensional image acquisition apparatus of this invention is specifically explained using a numerical example. The requested performance specifications for measurement of the three-dimensional shape should be such that the measurement range is 35 µm, the measurement accuracy is about 5 µm, and the intervals of the positions in focus of images are 10 µm.

From the requested measurement accuracy, the image forming lens 21 must have a depth of focus of about 5 µm. Therefore, a lens with a numerical aperture of about 0.3 and a magnification of 10 is used for the target. Since transparent plates 4 are caused to intersect the optical axis, the objective should be designed taking this into account is suited.

Eight transparent plates 4 are needed for this apparatus. The transparent plates 4 are made of optical glass with an refractive index of 1.50. It is preferable to make all transparent plates 4 of the same glass preparation so that their refractive indices are exactly the same. These plates are formed in different thicknesses varying by 30 µm so as to shift the position in focus by 10 µm.

These eight transparent plates 4 are disposed at intervals of 45 degrees on the rotary support 51. The rotary support 51 is rotated continuously at a constant speed by the drive means 6. If the output signal of the two-dimensional image pickup means 1 is an NTSC signal, the field period is 1/60 second. Therefore, by determining the rotational speed of the rotary support 51 to be 450 rpm, the image can be acquired each time the adjacent transparent plate 4 is caused to intersect the optical axis. The exposure time used is 1/500 second.

Figure 5:
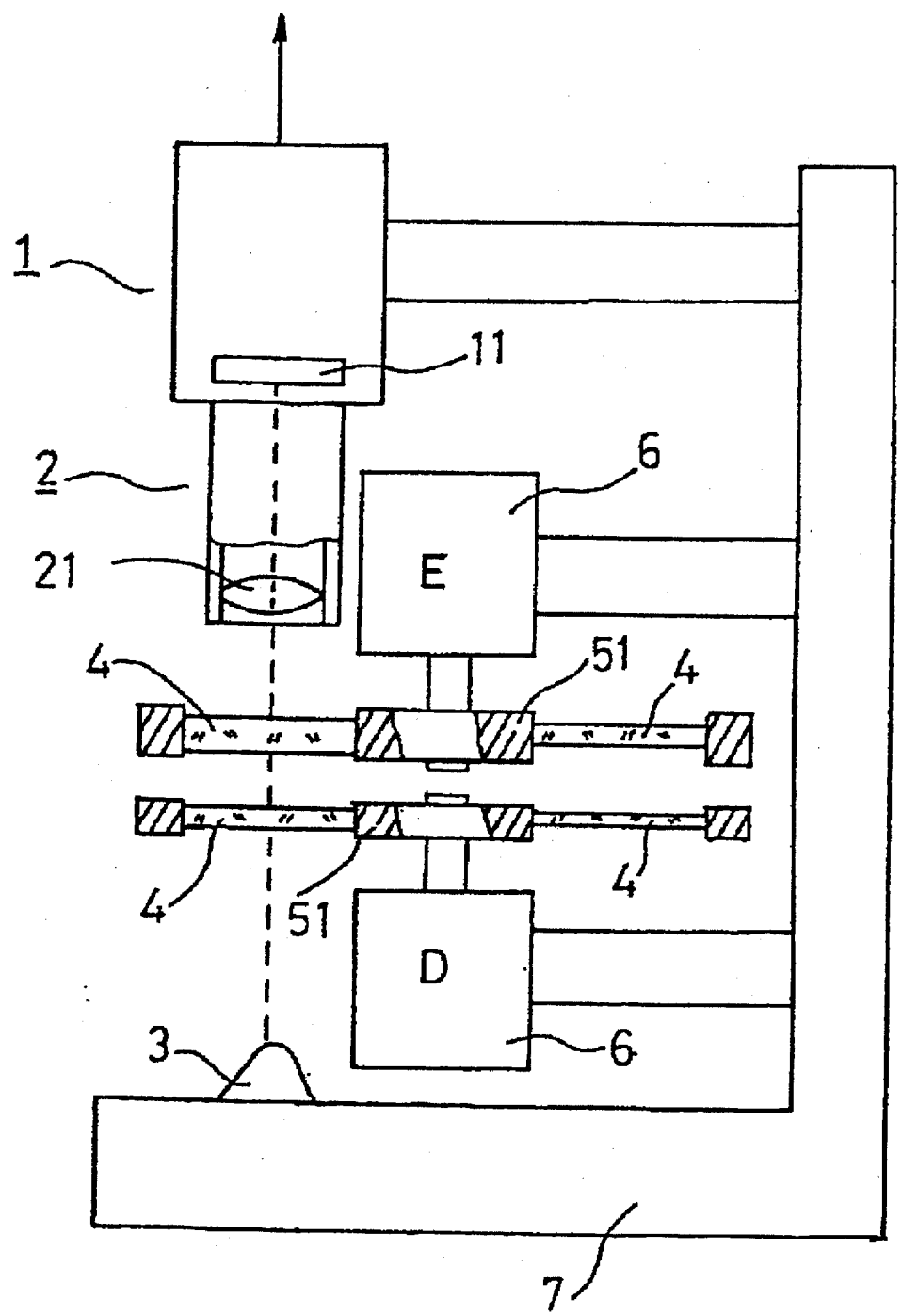
FIG. 5 as a partial sectional side view of a modification of the first embodiment of a three-dimensional image acquisition apparatus of this invention shown in FIG. 1.

FIG. 5 shows a three-dimensional image acquisition apparatus with two rotary supports 51, each in the shape of a circular plate. In this embodiment, the two rotary supports 51 are driven by separate drive means 6. One drive means 6 (D) rotates one rotary support 51 continuously, and the other drive means (E) rotates the other rotary support 51 intermittently. While the continuously rotated rotary support 51 is rotated once, the intermittently rotated rotary support 51 is halted to cause a transparent plate 4 of the continuously rotated rotary support to intersect the optical axis.

By rotating the two rotary supports in this manner, a large number of images with different positions in focus can be obtained with a small number of transparent plates 4.

Figure 6:
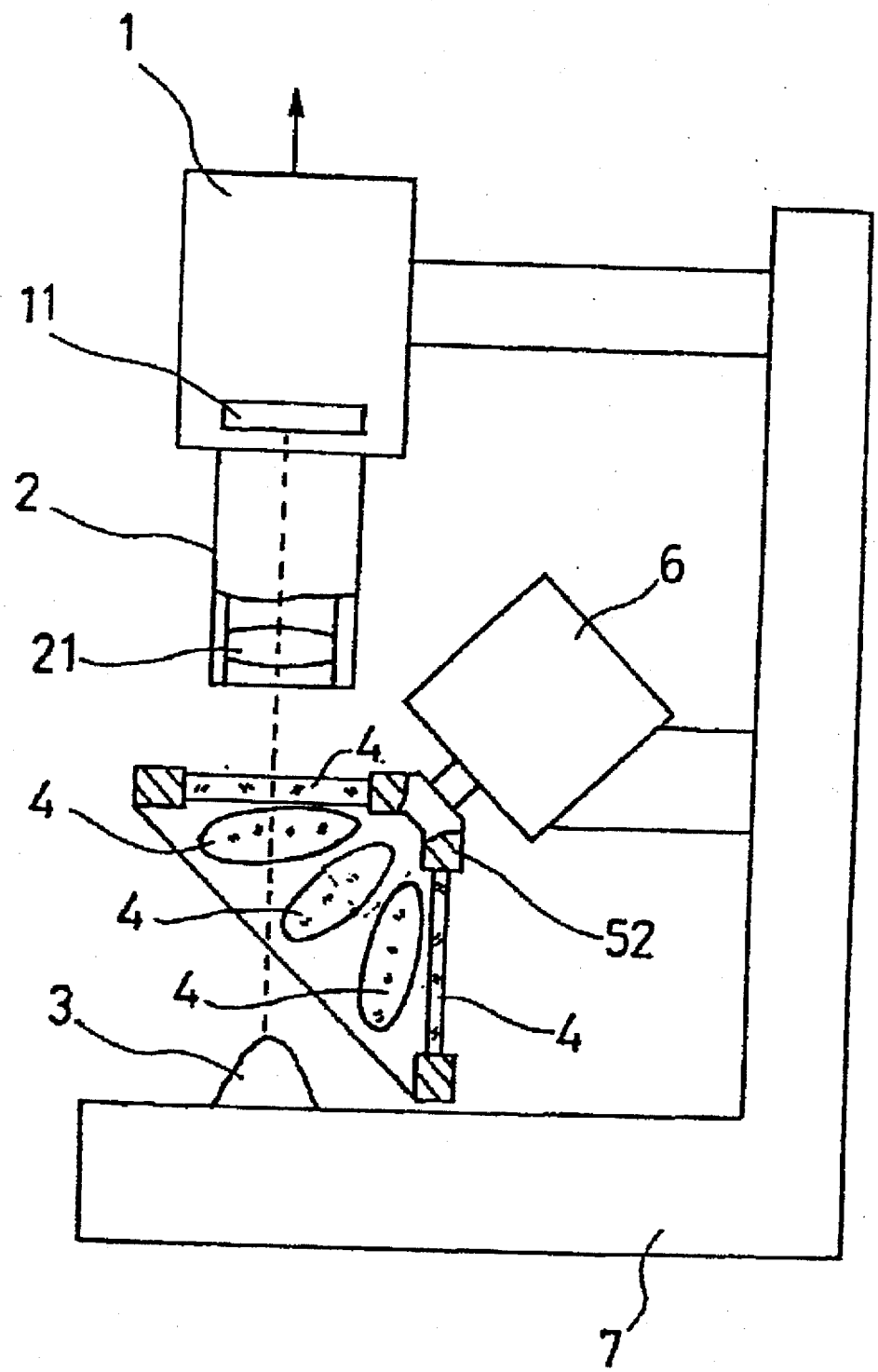
FIG. 6 is a partial sectional side view of a third embodiment of a three-dimensional image acquisition apparatus of this invention.
Figure 7:
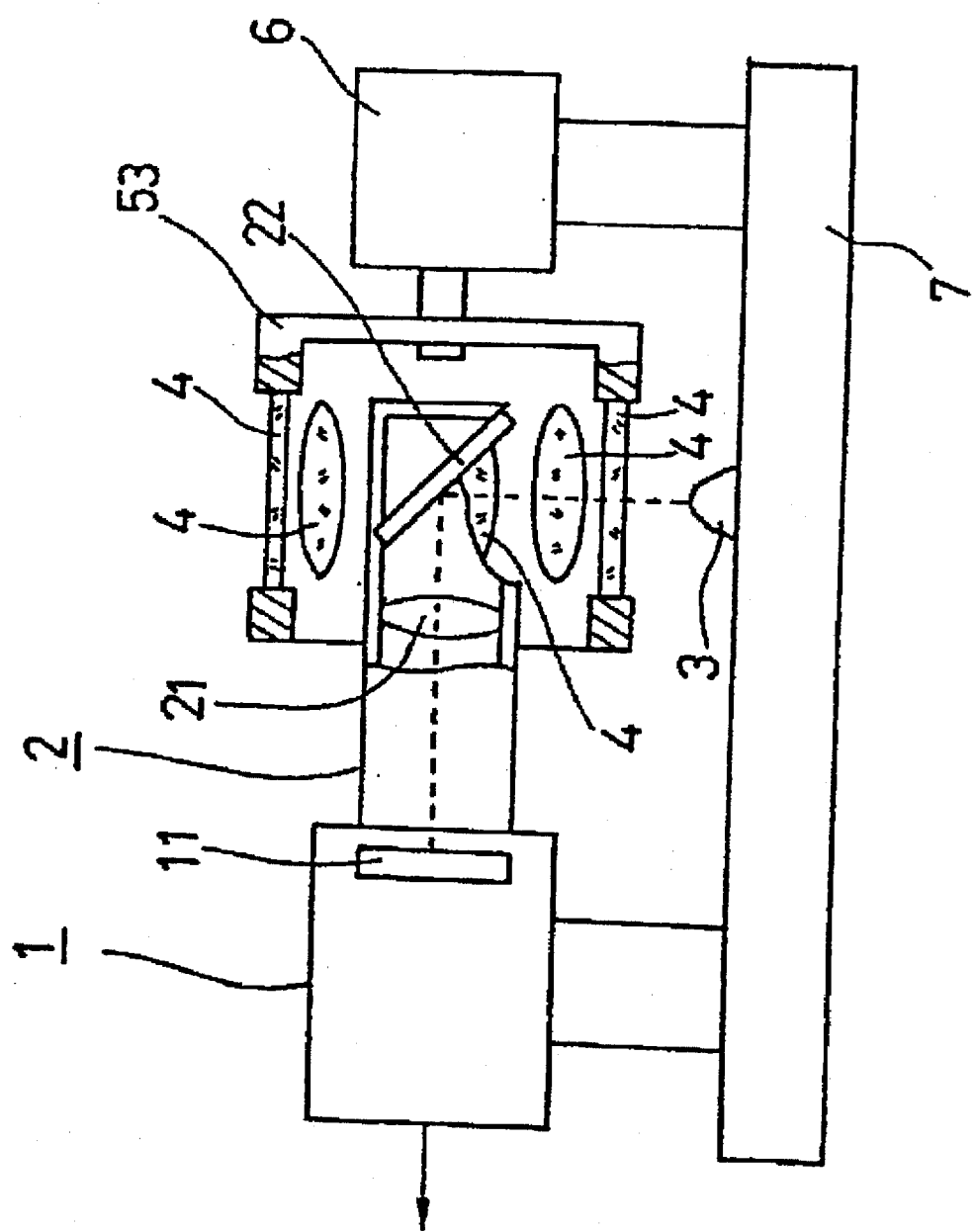
FIG. 7 is a partial sectional side view of a fourth embodiment of a three-dimensional image acquisition apparatus of this invention.

FIGS. 6 and 7 show the third and fourth embodiments of the three-dimensional image acquisition apparatus of this invention. In the embodiment shown in FIG. 6, the transparent plates 4 are embedded in a conical rotary support 52. In the embodiment shown in FIG. 7, the transparent plates 4 are embedded in a cylindrical rotary support 53. In both embodiments, the rotary supports 52 and 53 are disposed so that the transparent plates 4 are in turn caused to intersect the optical axis at right angles as they are rotated. Although a mirror 22 is positioned between the object 3 and the image forming lens 21 in the embodiment of FIG. 7, the principle is the same.

A circular plate rotary support 51, a conical rotary support 52, and a cylindrical rotary support 53 are used in the above embodiments. Rotary support of other shapes may also be used if capable of supporting the transparent plates 4 so that the transparent plates 4 are in turn caused to intersect the optical axis as it is rotated.

Further, the transparent plates 4 may caused to intersect the optical axis between the image forming lens 21 and the two-dimensional image pickup means 1 instead of between the object 3 and the image forming lens 21.

As described above, in the three-dimensional image acquisition apparatus of this invention, unlike the conventional apparatus, the distance between the image forming lens and the two-dimensional image pickup means and the distance between the image forming lens and the object are fixed, and a plurality of transparent plates secured to rotary supports which differ in thickness or refractive index or both of them are in turn caused to intersect the optical axis between the object and the image forming lens or between the image forming lens and the two-dimensional image pickup means by rotation of the rotary support.

By this construction, images with the positions in focus shifted by a predetermined step can be acquired by rotating the rotary support and acquiring the image when each transparent plate intersects the optical axis.

Since the three-dimensional image acquisition apparatus of this invention does not move the image pickup unit in the same manner as the conventional apparatus, it can acquire images considerably less time with greater positional accuracy, eliminating the problem of the conventional apparatus of a longer acquisition time or a lower positional accuracy caused by moving the image pickup unit along the optical axis.

This application is based on Japanese patent application 68925/1995, filed on Mar. 3, 1995, and Japanese patent application 237947/1995, filed on Sep. 18, 1995, which are incorporated herein by reference in its entirety.

Obviously, numerous modifications and variations of the present invention are possible in light of the above teachings. It is therefore to be understood that, within the scope of the appended claims, the invention may be practiced otherwise than as specifically described herein.

What is claimed is:

1. A three-dimensional image acquisition apparatus comprising:

an image forming lens;

a two-dimensional image pickup means for converting the optical image of an object formed thereon by said image forming lens into electric signals, and outputting the electric signals to a processing unit;

at least one rotary support which has a plurality of uniform-thickness transparent plates which do not cause light rays to converge or diverge and differ in thickness or refractive index or both of them secured thereto and is disposed so that when rotated said transparent plates are in turn caused to intersect the optical axis between said image forming lens and said object or said image forming lens and said two-dimensional image pickup means; and at least one drive means for intermittently or continuously rotating said rotary support.

2. The three-dimensional image acquisition apparatus of claim 1, wherein said rotary support is a flat plate oriented so that the axis of revolution parallels the optical axis of said image forming lens and the plate rotates around the axis of revolution.

3. The three-dimensional image acquisition apparatus of claim 1, wherein said rotary support is a cone oriented so that the axis of revolution obliquely crosses the optical axis of the image forming lens and the cone rotates around the axis of revolution.

4. The three-dimensional image acquisition apparatus of claim 1, wherein said rotary support is a cylinder oriented so that the axis of revolution crosses the optical axis of the image forming lens at right angles and the cylinder rotates around the axis of revolution.

5. The three-dimensional image acquisition apparatus of claim 1, further comprising a mark placed at least one place of at least one of said rotary supports and a mark detecting means for detecting said mark and generating a signal, wherein the three-dimensional image acquisition apparatus performs the image acquisition by said two-dimensional image pickup means in synchronism with the signal generated by said mark detecting means.

6. The three-dimensional image acquisition apparatus of claim 1, wherein the degree of magnification of said transparent plates is substantially zero.

* * * * *